United States Patent Office 3,686,248
Patented Aug. 22, 1972

3,686,248
PROCESS FOR PRODUCING SODIUM, LITHIUM OR POTASSIUM DIHYDROCARBON DIHYDRIDES OF ALUMINUM
Gunner E. Nelson, Baton Rouge, La., assignor to Ethyl Corporation, New York, N.Y.
No Drawing. Filed Oct. 24, 1969, Ser. No. 869,359
Int. Cl. C07f 5/06
U.S. Cl. 260—448 A                                27 Claims

ABSTRACT OF THE DISCLOSURE

It is disclosed that sodium or lithium or potassium dihydrocarbon dihydrides of aluminum can be prepared by an improved reaction under comparatively mild conditions between a hydrocarbo aluminum compound having from 2 to about 30 carbon atoms per hydrocarbon radical with sodium or lithium or potassium metal, and hydrogen in the presence of aluminum catalyst, at a pressure from about 200 to about 2000 lbs. p.s.i.g. and at a temperature from about 100° C. to about 200° C., preferably in the presence of a solvent for the product. The hydrocarbon constituency of the product is substantially the same as the hydrocarbo constituency of the hydrocarbo aluminum reactant.

BACKGROUND OF THE INVENTION

Field of the invention

The invention relates to the preparation of sodium or lithium or potassium dihydrocarbon dihydrides of aluminum and in greater particularity to such aluminum compounds of sodium, potassium or lithium having hydrocarbon radicals containing from 2 to about 30 carbon atoms per radical. Such materials, as typified by sodium aluminum diethyl dihydride, and by the potassium or lithium counterparts, either singly or in mixtures with respect to alkali metals and alkyl groups, have excelllent mild and selective reducing properties for carbonyl groups such as aldehyde and keto groups in various organic compounds. They are conveniently soluble and useful in inert aromatic hydrocarbon solutions.

Description of the prior art

Prior art methods of producing alkali metal hydrocarbon dihydrides of aluminum involve the reaction of an alkali metal such as sodium with a hydrocarbo aluminum compound such as triethyl aluminum in the presence of hydrogen at elevated temperatures and at pressures of 2000 p.s.i.g. or higher. In general, the use of such high pressures requires expensive and specialized apparatus and process techniques of a sophisticated nature. The prior art reaction proceeds very slowly (about 24 hours or so).

It is accordingly an object of the present invention to provide a process whereby sodium or lithium or potassium dihydrocarbon dihydrides can be produced at a high reaction rate even at a comparatively low pressure of the order of 750 p.s.i.g., and at useful reaction rates at pressures as low as 200 p.s.i.g.

It is another object of the present invention to provide a process for producing sodium aluminum diethyl dihydride in high yield and with a rapid reaction rate with processing under comparatively mild conditions.

Another object of the present invention is to provide a catalyst for the reaction of hydrocarbo aluminum compounds with sodium, potassium or lithium and with hydrogen to produce dialkyl aluminum dihydrides of sodium, potassium or lithium, respectively.

Another object of the present invention is to provide unique solutions of alkali metal aluminum dialkyl dihydrides useful in reduction reactions.

Other and further objects and features of the present invention will become apparent upon careful consideration of the following detailed discussion.

SUMMARY

In accordance with the present invention, an improved process is provided for producing aluminum dihydrocarbon dihydrides of sodium, potassium or lithium by reacting a hydrocarbo aluminum compound having at least two hydrocarbon radicals per aluminum atom, each radical containing from 2 to about 30 carbon atoms, with sodium, potassium or lithium, respectively, and with hydrogen. A principal improvement resides in conducting the process in the presence of a catalytic quantity of aluminum of at least about 0.001 percent by weight based on the aluminum contained in the hydrocarbo aluminum compound fed to the process. The improved process is performed at a pressure from about 200 to about 2000 p.s.i.g. Catalytic quantities of aluminum of from about 200° C.

Excellent results at high reaction rates are obtained at pressures from about 750 to about 1250 p.s.i.g. Useful reaction rates are obtained at pressures as low as about 200 p.s.i.g. Catalytic quantites of aluminum of from about 0.1 to about 50.0 percent are more preferred, with quantities of from about 1.0 to about 10.0 percent even more preferred and quantities of about 2 to about 5 percent usually most preferred. Temperatures above the melting points of the alkali metal reactant and the product are desirable. Thus temperatures of from about 125° C. to 175° C. are preferred for most sodium and potassium compounds with temperatures somewhat higher being preferred for lithium compounds.

The reaction is preferably conducted in an inert aromatic solvent for the product such as toluene, xylene, benzene, ethyl benzene and similar compounds having one or more rings. The reaction is also suitably performed in inert saturated cyclic or acyclic unsubstituted aliphatic hydrocarbon diluents such as cyclohexane, dodecane, heptane, and hexane. Unsaturated solvents are useful; however, to minimize side reactions it is usually desirable to avoid materials with non-benzenoid unsaturation. Aliphatic hydrocarbons provide a convenient way for forming high purity crystalline product by replacing a solvent with a diluent above the melting point of the product, then cooling the mixture. A fine crystalline product of a sharp melting point is obtained directly.

The present process is particularly useful in preparing alkali metal aluminum diethyl dihydrides which are excellent reducing agents for carbonyl groups in organic compounds. These materials are readily soluble in benzene and other aromatic hydrocarbons and are readily crystallized in high purity from admixture in the molten state with aliphatic hydrocarbons such as hexane.

From cost-effectiveness and ease of use points of view as a reducing agent, a preferred alkali-metal aluminum dihydrocarbon dihydride is sodium aluminum diethyl dihydride. This compound provides a comparatively high ratio of reducing capability per pound. Other typical useful products are similar normal butyl and isobutyl compounds. Other useful products are similar compounds having other organic radicals.

A form of the alkali metal aluminum dihydrocarbon dihydrides particularly useful is in a solution in an inert aromatic hydrocarbon, typically from about 1 percent by weight solution up to a saturated solution, a typical solution being sodium aluminum diethyl dihydride in a 10 or 20 percent by weight quantity in benzene. Concentrated solutions are usually diluted before or during use in reducing and other chemical reactions.

In one aspect of the invention, at least a part of the solvent for the reaction, with or without additional solvent, constitutes a novel composition of matter particularly convenient and useful for reducing carbonyl containing organic compounds such as decyl aldehyde.

The aluminum material used in the process of the present invention is preferably finely-divided ordinary aluminum such as commercial casting variety, in particle size of about 1/8" or smaller, the surface of which has been prepared in some conventional way in an inert atmosphere as by ball milling, chipping, grinding or other well known operations such as described in U.S. Pats. 2,826,598 and 3,104,252.

Other hydrocarbo aluminum compounds useful in the present process are tri-n-hexyl aluminum, tri-2-ethyl hexyl aluminum.

Example I

An autoclave provided with agitation was purged with dry hydrogen and then charged with 125 milliliters (ml.) of toluene, 22.4 grams (0.197 mol) triethyl aluminum, 5.0 grams (0.217 mol) of sodium, and 2.0 grams (0.074 mol) of aluminum powder. The autoclave was purged with hydrogen and pressurized with hydrogen to 100 p.s.i.g. and heated to 175° C. The pressure was then raised to 1000 p.s.i.g. and held until the rate of hydrogen uptake became virtually nil. The time was about 30 minutes. The mixture was cooled to 25° C. and filtered.

The filtrate was then partially evaporated to about 60 ml. and then poured into 600 ml. of dry normal hexane, then heated to about 50° C.

Precipitated solids were collected, treated with pentane and dried under vacuum yielding 21.4 grams of product. The product had a melting point of 83-85° C. which agrees with the reported value for $NaAlEt_2H_2$.

The hydride versus alkyl proton ratio was determined by nuclear magnetic resonance analysis in benzene-$d_6$ at 70° C. It was substantially 1:5 (hydride protons to alkyl protons). The yield of 21.4 grams is substantially 100 percent based on the conversion of $R_3Al$ to $NaAlR_2H_2$.

Example II

Example I was repeated with 0.5 gram of aluminum powder at 750 p.s.i.g. for a reaction time of 100 minutes. Similar results were obtained.

Example III

Example I was repeated with 100 ml. toluene, 33.0 grams (0.166 mol) of triisobutyl aluminum, 4.0 grams (0.174 mol) sodium, and 2.0 grams aluminum powder. The reaction time was 3 hours. The product was identified as in Example I. The yield was 68 percent.

Example IV

Example I is repeated at 200 p.s.i.g. for about 5 hours. Similar results are obtained.

Example V

Example I is repeated using 56 grams (0.199 mol) of tri-n-hexyl aluminum, 5.0 grams (0.217 mol) of sodium, 2.0 grams (0.074 mol) of aluminum and 125 ml. of toluene. Similar desirable results are obtained.

Example VI

Example V is repeated using 64 grams (0.198 mol) of tri-2-ethyl hexyl aluminum. Similar desirable results are obtained.

Example VII

Prior examples are repeated with potassium instead of sodium. Similar desirable results are obtained.

Example VIII

Prior examples are repeated with lithium instead of sodium. Similar desirable results are obtained.

Example IX

Prior examples are repeated with other aluminum hydrocarbon compounds, unbranched, branched, cyclic, and unsaturated, having from 2 to 30 carbon atoms per hydrocarbon radical. Similar desirable results are obtained.

Example X

Prior examples are repeated with various quantities of aluminum ranging from about 0.001 to about 50 percent of aluminum based on weight of aluminum present in the starting organic aluminum compound. Similar desirable results are obtained.

Example XI

Prior examples are repeated at temperatures from about 100° C. to about 200° C. Similar desirable results are obtained.

Example XII

Prior examples are repeated at pressures from about 200 to about 2000 p.s.i.g. Similar desirable results are obtained.

Example XIII

Prior examples are repeated with other aromatic hydrocarbon solvents, with paraffinic hydrocarbon diluent, and without hydrocarbon diluents using a heel of the product at the beginning of the reaction. Similar desirable results are obtained.

Example XIV

Prior examples are repeated in aromatic hydrocarbon solvent and the product filtered to provide a solution of alkali metal aluminum dialkyl dihydride. Concentration is increased by vaporization of part of the solvent. Concentration is decreased by dilution with added solvent. The solution is useful for reducing various functional groups such as: carbonyl groups, nitrile groups and, in general, functional groups having multiple bond linkage between carbon and another element such as oxygen, nitrogen, and the like. Typical solution concentrations range from about 1 percent by weight to saturated solutions, 10 percent, 15 percent and 20 percent being typical.

As noted above, the hydrocarbo aluminum compound used as a reactant in the process contains at least two hydrocarbon radicals per aluminum atom and each radical contains from 2 to about 30 carbon atoms. Thus two general groups of reactants may be employed; that is, dihydrocarbo aluminum hydrides ($R_2AlH$) and trihydrocarbo aluminum compounds ($R_3Al$) where each R is a hydrocarbon group of 2 to about 30 carbon atoms. The hydrocarbon groups present in these reactants may vary and include alkyl, cycloalkyl, alkenyl, aryl, aralkyl, alkaryl, cycloalkenyl, alkynyl and like hydrocarbon radicals. Thus, use may be made of such compounds as dioctyl aluminum hydride, trioctadecyl aluminum, dicyclohexyl aluminum hydride, tris-(dimethylcyclohexyl) aluminum, trivinyl aluminum, trioctenyl aluminum, diphenyl aluminum hydride, triphenyl aluminum, ditolyl aluminum hydride, trixylyl aluminum, tribenzyl aluminum, tris-(2-phenethyl) aluminum, tricumenyl aluminum, tris-(4-cyclohexenyl) aluminum, triheptynyl aluminum, tris-triacontyl aluminum, tricitronellyl aluminum, and the like including mixed alkyl aluminum systems such as those produced by ethylene chain growth or polymerization. Generally speaking, however, it is preferable from the standpoint of availability and ease of manufacture to employ dialkyl aluminum hydrides and trialkyl aluminum compounds as the reactants, especially those containing 2 to about 20 carbon atoms in each alkyl group. Furthermore, from the viewpoints of maximum reducing capability of end product on a weight basis and ease of synthesis, the use as reactants of dialkyl aluminum hydrides and trialkyl aluminum compounds having alkyl groups of 2 to 6 carbon atoms is especially preferred. Exemplary alkyl compounds are diethyl aluminum hydride, triethyl aluminum, tripropyl aluminum, tri-n-butyl aluminum, triisobutyl aluminum, diisobutyl aluminum hydride, trihexyl aluminum, dihexyl aluminum hydride and the like.

I claim:
1. In a process for producing aluminum dihydrocarbon dihydrides of sodium, potassium or lithium by reacting
   (A) a hydrocarbo aluminum compound having at least two hydrocarbon radicals per aluminum atom, each radical containing from 2 to about 30 carbon atoms,
   (B) with sodium, potassium or lithium, respectively, and with
   (C) hydrogen
the improvement wherein the reaction is conducted in the presence of a catalytic quantity of aluminum of at least about 0.001 percent by weight based on the aluminum contained in the hydrocarbo aluminum compound fed to the process,
   and wherein the reaction is conducted at a pressure from about 200 to about 2000 p.s.i.g., and at a temperature from about 100° C. to about 200° C.

2. In a process for producing aluminum dihydrocarbon dihydrides of sodium, potassium, or lithium by reacting
   (A) a trihydrocarbo aluminum compound having from 2 to about 30 carbon atoms per hydrocarbon radical
   (B) with sodium, potassium or lithium, respectively, and with
   (C) hydrogen
the improvement wherein the reaction is conducted in the presence of a catalytic quantity of aluminum of at least about 0.001 percent by weight based on the aluminum contained in the trihydrocarbo aluminum compound fed to the process,
   and wherein the reaction is conducted at a pressure from about 200 to about 2000 p.s.i.g., and at a temperature from about 100° C. to about 200° C.

3. The process of claim 1 wherein the hydrocarbo aluminum compound is an alkyl aluminum having from about 2 to about 20 carbon atoms per alkyl group.

4. The process of claim 1 wherein the hydrocarbo aluminum compound is an alkyl aluminum having from about 2 to about 6 carbon atoms per alkyl group.

5. The process of claim 1 wherein the hydrocarbo aluminum compound is a trialkyl aluminum having from about 2 to about 30 carbon atoms per alkyl group.

6. The process of claim 1 wherein the hydrocarbo aluminum compound is a trialkyl aluminum having from about 2 to about 6 carbon atoms per alkyl group.

7. The process of claim 1 wherein the hydrocarbo aluminum compound is triethyl aluminum.

8. The process of claim 1 wherein the hydrocarbo aluminum compound is tri-isobutyl aluminum.

9. The process of claim 1 wherein the hydrocarbo aluminum compound is a dialkyl aluminum hydride having from about 2 to about 30 carbon atoms per alkyl group.

10. The process of claim 1 wherein the hydrocarbo aluminum compound is a dialkyl aluminum hydride having from about 2 to about 6 carbon atoms per alkyl group.

11. The process of claim 1 wherein the hydrocarbo aluminum compound is diethyl aluminum hydride.

12. The process of claim 1 wherein the hydrocarbo aluminum compound is di-normal butyl aluminum hydride.

13. The process of claim 1 wherein the hydrocarbo aluminum compound is di-isobutyl aluminum hydride.

14. The process of claim 1 for producing sodium aluminum dihydrocarbon dihydrides wherein sodium is reacted.

15. The process of claim 1 for producing potassium aluminum dihydrocarbon dihydrides wherein potassium is reacted.

16. The process of claim 1 for producing lithium aluminum dihydrocarbon dihydrides wherein lithium is reacted.

17. The process of claim 1 wherein the pressure is from about 750 to about 1250 pounds per square inch gage.

18. The process of claim 1 wherein the temperature is from about 125° C. to about 175° C.

19. The process of claim 1 wherein the catalytic quantity of aluminum is from about 0.1 percent to about 50 percent by weight based on the aluminum contained in the hydrocarbo aluminum compound fed to the process.

20. The process of claim 1 wherein the catalytic quantity of aluminum is from about 1 percent to about 10 percent by weight based on the aluminum contained in the hydrocarbo aluminum compound fed to the process.

21. The process of claim 1 wherein the catalytic quantity of aluminum is from about 2 to about 5 percent by weight based on the aluminum contained in the hydrocarbo aluminum compound fed to the process.

22. The process of claim 1 for producing sodium aluminum diethyl dihydride wherein the hydrocarbo aluminum compound is triethyl aluminum, where sodium is reacted, where the temperature is from about 125° C. to about 175° C., where the pressure is from about 750 to about 1250 pounds per square inch gage and wherein the catalytic quantity of aluminum is from about 2 to about 5 percent by weight based on the aluminum contained in the hydrocarbo aluminum compound fed to the process.

23. The process of claim 1 wherein the amount of sodium fed is in a molar excess ranging from about stoichiemtric to about 50 percent excess above stoichiometic based on the aluminum present in the hydrocarbo aluminum compound fed to the reaction.

24. The process of claim 1 further characterized in that it is conducted in an inert aromatic hydrocarbon solvent for the product.

25. The process of claim 24 wherein the solvent is benzene.

26. The process of claim 24 wherein the product is held above the melting point of the product and at least a portion of the solvent replaced with diluent whereby at least a portion of the product is converted to a separate liquid phase in admixture with the diluent and wherein the mixture is then cooled below the melting point of the product to form a crystalline phase product.

27. The process of claim 26 wherein the diluent is hexane.

References Cited
UNITED STATES PATENTS

| | | | |
|---|---|---|---|
| 2,989,557 | 6/1961 | Blitzer et al. | 260—448 A X |
| 3,050,541 | 8/1962 | Gould | 260—448 A |
| 3,507,895 | 4/1970 | Casensky et al. | 260—448 AD |

FOREIGN PATENTS

| | | | |
|---|---|---|---|
| 1,116,664 | 11/1961 | Germany | 260—448 A |

OTHER REFERENCES

Chemical Abstracts, vol. 56 p. 1121 a–d (1962).
Chemical Abstracts, vol. 57, p. 16109 a–d (1962).
Ashby et al., Inorganic Chemistry, vol. 2, 1963, pp. 499–504.
Chemical Abstracts, vol. 57, 12520c (1962).
Chemical Abstracts, vol. 67, 70140c (1967).
Kohetz et al., Inorg. Chem., vol. 2, pp. 859–861 (1963).

TOBIAS E. LEVOW, Primary Examiner

H. M. SNEED, Assistant Examiner

PO-1050
(5/69)

UNITED STATES PATENT OFFICE
CERTIFICATE OF CORRECTION

Patent No. 3,686,248      Dated August 22, 1972

Inventor(s) Gunner E. Nelson

It is certified that error appears in the above-identified patent and that said Letters Patent are hereby corrected as shown below:

Column 2, line 21, reads "p.s.i.g. Catalytic quantities of aluminum of from about", should read -- p.s.i.g. and at a temperature from about 100°C to about --. Column 6, line 32, reads "chiemtric", should read -- chiometric --; same line, reads "stoichiometic", should read -- stoichiometric --.

Signed and sealed this 1st day of May 1973.

(SEAL)
Attest:

EDWARD M. FLETCHER, JR.    ROBERT GOTTSCHALK
Attesting Officer    Commissioner of Patents